March 15, 1966     T. F. WOOD ETAL     3,240,829
ISOPROPYL-1,1-DIMETHYLHEXAHYDROINDANS AND PROCESS FOR
PREPARING DIMETHYLINDANS
Filed Oct. 11, 1962
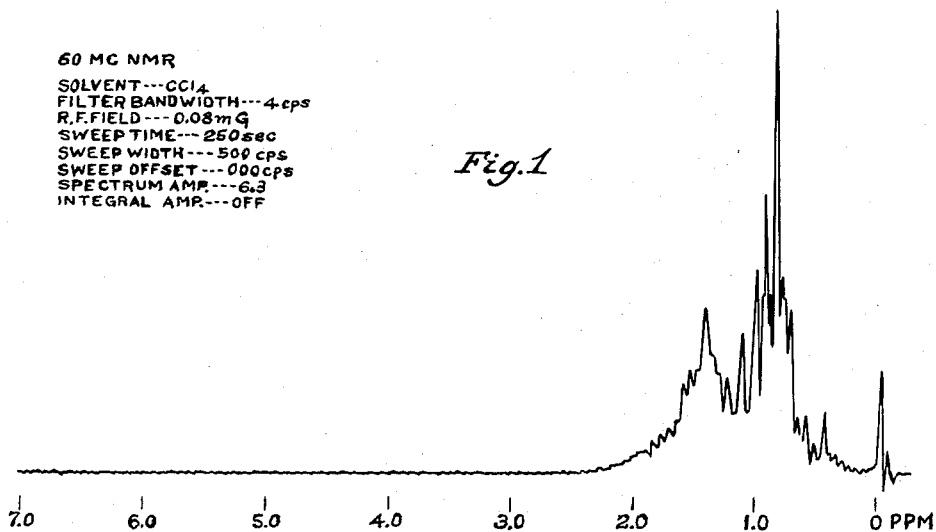
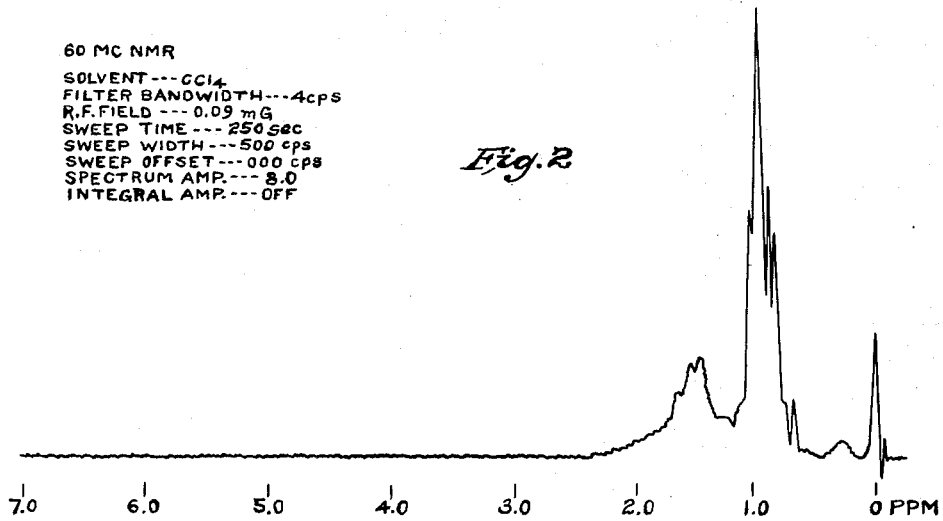
INVENTORS:
Thomas F. Wood
BY John Angiolini
Richards and Gifelli,
Attorneys United States Patent Office 3,240,829
Patented Mar. 15, 1966

3,240,829
ISOPROPYL-1,1-DIMETHYLHEXAHYDROINDANS AND PROCESS FOR PREPARING DIMETHYL-INDANS
Thomas F. Wood, Wayne, and John Angiolini, Clifton, N.J., assignors to The Givaudan Corporation, New York, N.Y., a corporation of New Jersey
Filed Oct. 11, 1962, Ser. No. 229,867
The portion of the term of the patent subsequent to Sept. 29, 1981, has been disclaimed
17 Claims. (Cl. 260—668)

The present application is a continuation-in-part of our two-copending applications, filed October 27, 1960, Serial Nos. 65,261 and 65,290, both of which are now abandoned.

This invention relates to isopropyl-1,1-dimethylhexahydroindans and to a process for preparing dimethylindans. More specifically, it relates to the condensation of dialyl-substituted benzenes with 2-methyl-1,3-butadiene or with 2,3-dimethyl-1,3-butadiene in the presence of acidic condensing agents to produce dialkyl-1,1-dimethylindans or the corresponding dialkl-1,1,2-trimethylindans.

An object of this invention is to produce dialkyl-1,1-dimethylindans and dialkyl-1,1,2-trimethylindans by a simple, convenient and inexpensive process readily adaptable to commercial usage. The advancement of the art is a further object. The disclosure of a hithertofore unknown reaction is a further object.

In the past, compounds of the type produced by this invention have been synthesized by expensive multistep methods usually involving formation of a Grignard reagent followed by condensation to yield a tertiary alcohol. Cyclodehydration of the tertiary alcohol by the method of Davidson and Bogert (J. Am. Chem. Soc. 56,185) (1934) yields the hydrocrabon,1,1-dimethylindan. Finally, alkylation is effected to produce an isomeric mixture containing 5- and 6-alkyl-1,1-dimethylindans. For example, this procedure is followed by Beets and co-workers in the synthesis of an isomeric mixture of tert.-butyl-1,1-dimethylindans (Rec. Trav. Chim. 77,856) (1958). A similar approach is outlined in the patent literature (Beets et al. U.S. 2,889,367 and German Patent 1,059,902). It has recently been shown that the intermediate, 1,1-dimethylindan, may be synthesized by cyclization of β-phenylisovaleric acid with polyphosphoric acid to produce 3,3-dimethyl-1-indanone followed by reduction either catalytically or by the Wolff-Kishner method (Ferrero and Helg. Helv. Chim. Acta XLII, 2111) (1959). While the above-mentioned methods are undoubtedly of great academic interest, it is obvious that they are unsuitable for production on a commercial scale owing to the great number of steps involved and expensive reactants employed.

Now we have discovered that dialkyl-1,1-dimethylindans can be easily synthesized by a simple one-step reaction using cheap and readily available chemicals, namely, isoprene, acid catalysts, e.g., sulfuric acid, 93%, and the dialkylbenzenes.

The overall reaction may be represented as follows:

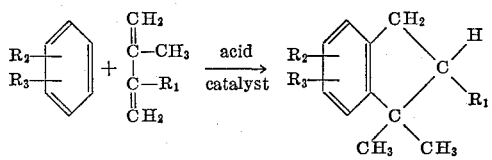

where $R_1$ is H or $CH_3$, and $R_2$ and $R_3$ are alkyl groups having up to 5 carbon atoms, except that if $R_1$ is $CH_3$ and $R_2$ and $R_3$ are para to each other and one of them is isopropyl, then the other is a member selected from the group consisting of methyl, isopropyl, tert.-butyl and tert.-amyl.

Advantageously, the reaction is conveniently carried out by the slow addition of the "-diene" or a solution of the "-diene" in an inert solvent or in the dialkylbenzene to a cold, rapidly-stirred (—10 to 10° C.) suspension of the dialkylbenzene in aqueous concentrated sulfuric acid (93%). The reaction temperature is maintained at —10 to 10° C. during the addition which usually requires from 2 to 3 hours depending on the efficiency of the cooling. After addition is completed, the mixture is stirred a short time and quenched, or the acid separated. After being washed neutral the solution is vacuum-distilled to yield the indan. An alternate mode of operation is to feed a solution of the "-diene" and all of the dialkylbenzene slowly into the cold sulfuric acid.

It is an advantage of this process that it may be operated at low temperature under atmospheric pressure. The preferred reaction temperatures are considerably lower than the boiling point of isoprene and this reduces the hazard of fire and explosion. Furthermore, apparatus suitable for carrying out reactions under atmospheric pressure is considerably cheaper and simpler in construction and design than that required for pressure reactions.

Dialkylbenzenes which have been successfully condensed in accordance with this invention are o-xylene, m-xylene, p-xylene, diethylbenzenes, butylethylbenzene, ethyltoluene, butyltoluene, m,p-cymenes, para-ethylacumene and diisopropylbenzenes.

While aqueous sulfuric acid of about 93% concentration gives advantagesous results, sulfuric acid of other concentrations, as well as other condensing catalysts may be used in accordance with the present invention. Thus, sulfuric acid within the range from about 75% to about 96% strength has been found to give desirable results. The 93% strength sulfuric acid is preferred because it is commercially available, gives excellent yields with a minimum of by-products and has a low freezing point much below the temperature of the reaction.

Other acids which may be used as condensing catalysts herein are those acids which are capable of acting as Friedel-Crafts condensing catalysts. Examples of such acids are phosphoric acid, polyphosphoric acid, boron trifluoride-water complex and hydrofluoric acid.

In carrying out the process of this invention the proportions of the ingredients may be varied over wide limits. It is preferred to use at least 1 mol and advantageously 2 to 10 mols of the dialkylbenzene per mol of diolefin in order to minimize side reactions, such as polymerization of the diolefin. The acid catalysts may be employed in amounts varying from about 5 to about 100%, by weight, based on the dialkylbenzene employed.

The temperature at which the process of this invention is carried out may also be varied over wide limits, i.e., from about —30° C. to about 150° C. When sulfuric acid is employed, the temperature may advantageously be from about —30° C. to about 80° C. In general, the higher the acid strength, the lower the temperature to be used. Thus, when sulfuric acid of about 75%–80% strength is used, a temperature above 50° C., preferably 60° C. to 80° C. is desirable. When sulfuric acid of about 80% to 90% concentration is used, a temperature within the range from about 5° C. to about 50° C. is suitable. With sulfuric acid of 90%–96% strength, temperature from about —30° C. to about 15° C., preferably from about —10° C. to 10° C., is desirable.

When milder condensing acids, such as phosphoric and polyphosphoric acids, are used, higher reaction temperatures, such as about 105° C. to 150° C., are suitable. Anhydrous HF is active at about the same temperatures as 93% sulfuric acid, namely —30° to 50° C. The $BF_3 \cdot H_2O$ catalyst is quite active at 25° to 35° C.

The indans formed by the process (and examples) of this invention are suitable for use as chemical intermediates, intermediates for odorants, including musk odorants, low cost aromatic solvents, diesel fuel additives, and as intermediates for the preparation of saturated bicyclic hexahydroindans with the desirable characteristics required in jet fuels. These saturated indans may be prepared by hydrogenating the indans formed by the present process at elevated temperatures, e.g., 200° C. or higher, in the presence of Raney nickel as catalyst.

In a recent patent (U.S. 2,916,529 to Sinclair Refining Company) it is stated that "the production of indan and its homologues has commercial interest in that indans are useful as intermediates in the production of the unsaturated indenes which are in turn of value since they are readily polymerized to yield valuable resins." It is thus apparent that the process of this invention may have significant commercial interest in the field of synthetic resins.

The invention is further illustrated by the following examples, without, however, limiting it to them.

*Example I.—1,1,4,6-tetramethylindan*

There was fed dropwise a solution of 58 g. of isoprene in 80 g. of m-xylene into a cold (—5° C.) rapidly-stirred suspension of 154 g. of 93% sulfuric acid in 302 g. of m-xylene over a period of 2 hrs. while the temperature was regulated at —5 to 0° C. Stirring was continued in the cold for 40 minutes longer. The mixture was allowed to settle and the sulfuric acid layer was discarded. The remaining oil layer was washed neutral with 200 ml. of water, followed by 100 ml. of aqueous 5% caustic soda solution and 100 ml. of 5% aqueous sodium bicarbonate solution.

After distillation the desired condensation product was obtained as a colorless liquid, B.P. 75° C. (2 mm.), $n_D^{20}$ 1.5156, $d_4^{20}$ 0.9159, amounting to 70 g.

A dinitro derivative melted at 92–93.5° C.

*Example II.—1,1,2,4,6-pentamethylindan*

By the method of Example I there was condensed 77.3 g. 2,3-dimethyl-1,3-butadiene with meta xylene to yield 79 g. of an indan believed to be 1,1,2,4,6-pentamethylindan. The compound is a colorless liquid, B.P. 87° C. (1.5 mm.), $n_D^{20}$ 1.5158. The vapor-phase chromatogram showed a single compound.

*Example III.—1,1,4,7-tetramethylindan*

By the method of Example I there was condensed 58 g. of isoprene with para xylene to yield 46 g. of the desired product as a colorless liquid, B.P. 83–84° C. (2.5 mm.), $n_D^{20}$ 1.5241.

*Example IV.—1,1,2,4,7-pentamethylindan*

By the method of Example I there was condensed 77.3 g. 2,3-dimethyl-1,3-butadiene with para xylene to yield 17 g. of the desired product, B.P. 82–87° C. (1.5 mm.), $n_D^{20}$ 1.5218, as a colorless liquid. The vapor-phase chromatogram showed only one compound.

*Example V.—1,1,5,6-tetramethylindan and isomers*

By the method of Example I there was condensed 58 g. of isoprene (1 mole) with ortho xylene to yield 62 g. of condensation product, a colorless liquid, B.P. 82–84° C. (2.5 mm.), $n_D^{20}$ 1.5221. The vapor-phase chromatogram indicated the presence of 3-isomeric indans.

*Example VI.—1,1,2,5,6-pentamethylindan and isomers*

By the method of Example I there was condensed 77.3 g. 2,3-dimethyl-1,3-butadiene with ortho xylene to yield 82 g. of condensation product, a colorless liquid, B.P. 81–85° C. (2 mm.) $n_D^{20}$ 1.5208. Vapor-phase chromatogram indicated the presence of 2 major isomers, probably 1,1,2,5,6- and 1,1,2,4,5-pentamethylindans.

*Example VII.—4-(5-, 7-) 6-diethyl-1,1dimethylindan*

Into a vigorously agitated suspension of 196 g. of 93% sulfuric acid and 442 g. tech. diethylbenzene, chilled to —9° C., was added dropwise over a 4 hour period a solution of 68 g. of isoprene (1 mole) and 134 g. tech. diethylbenzene keeping the temperature at —4 to —1° C. Stirring was continued for 40 minutes after the feed. The mixture was allowed to settle and the sulfuric acid layer removed (204 g.). The oil layer was washed successively with water (2 x 200 ml.), 5% aqueous sodium hydroxide solution (100 ml.) and 5% aqueous bicarbonate of soda solution (200 ml). The solution was distilled first at 21–20 mm. Hg to yield 387 g. rec. diethylbenzene. The residual liquid was distilled at 2 mm. to give the desired product, a colorless liquid, B.P. 85–88° C., $n_D^{20}$ 1.5135–54 amounting to 138 g. The residue and heavies amounted to 36 g.

The acetyl derivative was obtained as a colorless, nearly odorless, viscous liquid, B.P. 117–118° C. (2 mm.), $n_D^{20}$ 1.5232.

*Analysis.*—Calcd. for $C_{17}H_{24}O$: C, 83.5; H, 9.85. Found: C, 83.33; H, 9.62.

*Example VIII.—6-(or 7-) tert.-butyl-1,1-dimethyl-4-ethylindan*

Into a vigorously agitated suspension of 200 g. of 93% sulfuric acid and 400 g. m,p-tert.-butylethylbenzene, chilled to —5° C., was added dropwise over a 4 hour period a solution of 75 g. isoprene and 135 g. m,p-tert.-butylethylbenzene, while keeping the temperature at —5 to 0° C. Stirring was continued 40 minutes after feed. Then the mixture was settled and the sulfuric acid layer removed (260 g.). The remaining oil was washed successively with water (100 ml.), 5% aqueous caustic soda solution (100 ml.) and 5% aqueous bicarbonate of soda solution (100 ml.). Upon vacuum distillation the desired product was obtained as colorless fraction, B.P. 97–99.5° C., $n_D^{20}$ 1.5070–86, sp. gr. 25°/25° C. 0.8958, amounting to 79 g. There was recovered 306 g. of unconverted tert.-butylethylbenzene as a forerun.

*Example IX.—6-(or 7-)-tert.-butyl-1,1,4-trimethylindans*

Into a vigorously agitated suspension of 308 g. of 93% sulfuric acid and 770 g. p-tert.-butyltoluene, chilled to —3° C., there was added dropwise over a 5¾ hour period a solution of 115 g. isoprene (1.65 moles) and 154 g. p-tert.-butyltoluene keeping the temperature at —4 to 0° C. Stirring was continued 40 minutes longer after the feed and then the mixture allowed to settle. The lower sulfuric acid layer was separated. The remaining oil layer was washed successively with water, 5% caustic soda solution and 5% bicarbonate of soda solution. After the excess tert.-butyltoluene was distilled off under reduced pressure (rec. 713 g.), the residual liquid was distilled at high vacuum to yield the desired fraction, B.P. 92–94° C. (2 mm.), $n_D^{20}$ 1.5061–86, which amounted to 123 g.

*Example X.—5,7-diisopropyl-1,1dimethylindan and isomers*

Into a vigorously-agitated suspension of 400 g. 93% sulfuric acid and 1,000 g. diisopropylbenzene (Dow Chem. Co. commercial grade) cooled to —4° C., there was slowly added dropwise a solution of 150 g. isoprene in 200 g. diisopropylbenzene over a 4½ hour period while the temperature was kept at —4 to 0° C. Stirring was continued for 40 minutes after the feed. The mixture was allowed to settle and the lower sulfuric acid layer (450 g.) separated. The remaining oil layer was washed successively with water (200 ml.), 5% caustic soda solution (100 ml.) and 5% sodium bicarbonate solution (200 ml.). The excess diisopropylbenzene was distilled off at 2 mm. and the desired 5,7-diisopropyl-1,1-dimethylindan and isomers was obtained as a colorless liquid, B.P. 89–94° C. (1 mm.), $n_D^{20}$ 1.5075, sp. gr. 25°/25° 0.8971, amounting to 314 g.

*Analysis.*—Calcd. for $C_{17}H_{26}$: C, 88.65; H, 11.37. Found: C, 88.68; H, 11.60.

The dinitro derivative prepared in the usual manner using mixed acid was obtained as a light yellow, odorless solid, M.P. 105–106° C.

The acetyl derivative prepared in the usual manner was obtained as a colorless solid which after one crystallization from methanol melted at 74–75° and had a musk-like odor.

*Analysis.*—Calcd. for $C_{19}H_{28}O$: C, 83.65; H, 10.35. Found: C, 83.41; H, 10.04.

*Example XI.—5,7-diisopropyl-1,1-dimethylhexahydroindan and isomers*

Into the stainless steel liner (1,500 ml. capacity) of a rocking autoclave was charged 404 g. diisopropyl-1,1-dimethylindan (preparation described in Example X) along with 50 g. of Raney nickel catalyst. Hydrogenation was conducted until no more hydrogen was absorbed at 198–206° C., using a hydrogen pressure of 2,000 lbs./in.² and good agitation. The batch was cooled, filtered free of catalyst and vacuum distilled. The desired diisopropyl-1,1-dimethylhexahydroindan was obtained as a colorless liquid, B.P. 93–96° C. (1 mm.) $n_D^{20}$ 1.4745–54, sp. gr. 25°/25° 0.8710. The heat of combustion was found to be 19,265 B.t.u. per pound (=140,000 B.t.u. per gallon). The boiling range at atmospheric pressure was found to be 277–280° C. (532–536° F.). The hydrocarbon did not freeze at −60° F. but was thick and viscous. It is suitable for use as a fuel in jet engines.

The infrared spectrum of the product of this example shows the following characteristic bands (0.30 mm. cell); 3.47 s., 6.83 s., 7.23 s., 7.32 s., 7.60–7.65 m., 7.85 w., 8.75 m., 10.89 w., 11.51 w., 11.57 w. and 15.05 w. microns.

*Analysis.*—Calcd. for $C_{17}H_{32}$ (mol. wt., 236.43): C, 86.36; H, 13.64. Found: C, 86.42, 86.60; H. 13.72, 13.40.

The Nuclear Magnetic Resonance Spectrum of the product of this example is shown in FIG. 2 of the accompanying drawings. The proton spectrum was determined with a Varian A–60 High Resolution NMR spectrometer.

*Example XII.—1,1,4-trimethyl-7-isopropylindan*

Into a vigorously-agitated suspension of 400 g. 93% sulfuric acid and 1,000 g. p-cymene cooled to −2° C., there was slowly added dropwise, a solution of 150 g. isoprene in 200 g. p-cymene over a 4½ hour period while the temperature was kept at −2 to +1° C. Stirring was continued for 40 minutes after the feed. The mixture was allowed to settle and the lower sulfuric acid layer was separated and discarded. The remaining oil layer was washed successively with 200 ml. of water, 100 ml. of aqueous 5% caustic soda solution and 100 ml. of 5% aqueous sodium bicarbonate solution. The excess p-cymene was distilled off (20 mm.) and the residual liquid distilled under high vacuum to yield as the main product a colorless liquid, B.P. 97–104° C. (2.2 mm.), $n_D^{20}$ 1.5161–1.5175, sp. gr. 25°/25° C. 0.9188, amounting to 248 g. Upon careful refractionation the product boiled mainly at 99–100° C. (2.1 mm.). It is useful as a solvent for the aforementioned purposes.

*Analysis.*—Calcd. for $C_{15}H_{22}$: C, 89.10; H, 10.88. Found: C, 89.01; H, 10.74.

Analyses of the infrared and nuclear magnetic resonance spectrograms, as well as the vapor-phase chromatogram, indicate that the product of this example has the structure indicated in the title.

Nitration of the hydrocarbon with mixed acid yielded an odorless dinitro derivative, M.P. 151–152° C.

*Analysis.*—Calcd. for $C_{15}H_{20}N_2O_4$: C, 61.70; H, 6.85; N, 9.58. Found: C, 62.00; H, 6.80; N, 9.52.

The acetyl derivative was prepared by acetylation in the presence of aluminum chloride using acetyl chloride. It was obtained as a colorless, odorless solid, M.P. 71–72.5° C.

*Analysis.*—Calcd. for $C_{17}H_{24}O$: C, 83.6; H, 9.87. Found: C, 83.58; H, 9.69.

*Example XIII.—1,1,4-trimethyl-7-isopropylhexahydroindan*

Into a stainless steel liner (1,500 ml. capacity) of a rocking autoclave was charged 404 g. of 1,1,4-trimethyl-7-isopropylindan (preparation described in Example XII) along with 50 gms. of Raney nickel catalyst. Hydrogenation was carried to completion, i.e. no more hydrogen could be absorbed at 200° C. using 2,000 lbs./in. of hydrogen. The batch was cooled, removed from the autoclave, filtered to remove catalyst and vacuum-distilled. After filtering off the catalyst the resulting 1,1,4-trimethyl-7-isopropyl-hexahydroindan was obtained as a colorless liquid, B.P. 76–79° C. (1 mm.), $n_D^{20}$ 1.4746–55, sp. gr. 25°/25° C. 0.8755. The heat of combustion was found to be 19,116 B.t.u. per pound (=139,738 B.t.u. per gallon). The boiling point at atmospheric pressure was 257.1–260° C. (495–500° F.). The liquid did not freeze at −100° F. but became very viscous. It is suitable for use as a fuel in jet engines.

The infrared spectrum of the product of this example shows the following principal bands (0.030 mm. cell): 3.45 s., 6.83 s., 7.21 s., 7.30 s., 7.63 w., 8.08 w., 8.53 m., 8.65 w., 8.88 w., 9.12 w., 9.33 w., 10.47 m., 10.83 w., 11.30 w., 11.40 w., 11.84 w. and 15.04 w. microns.

*Analysis.*—Calcd. for $C_{15}H_{28}$ (mol. weight 208.37): C, 86.46; H, 13.54. Found: C, 86.79, 86.92; H, 13.50, 13.30.

The Nuclear Magnetic Resonance spectrum of the product of this example is shown in FIG. 1 of the accompanying drawings. The proton spectrum was also determined with a Varian High Resolution NMR Spectrometer, as in the case of Example XI.

*Example XIV.—1,1-dimethyl-4-ethyl-7-isopropylindan*

Into a vigorously-stirred suspension of 154 g. 93% sulfuric acid and 444 g. p-ethylcumene, cooled to −10° C., was slowly added dropwise a solution of 68 g. isoprene in 148 g. p-ethylcumene over a 5 hour period keeping the temperature at −7 to 0° C. After the addition the mixture was stirred 40 minutes longer at 0° C. and then allowed to settle. The lower sulfuric acid layer was run off and discarded. The remaining oil layer was washed successively with 200 ml. of aqueous 5% caustic soda solution and 200 ml. of aqueous 5% sodium bicarbonate solution. The excess p-ethylcumene was distilled off and the residual liquid vacuum-fractionated to yield the desired product, a colorless liquid, B.P. 99–102° C. (1.5 mm.), $n_D^{20}$ 1.5145, sp. gr. 25°/25° C. 0.9136, amounting to 106 g.

The infrared spectogram indicates clearly that the product of this example has the indicated structure. A purity of more than 90% is shown by the vapor-phase chromatogram.

Upon nitration by mixed acid there was obtained the dinitro derivative, a bright yellow, odorless solid, M.P. 167–168° C.

An acetyl derivative was prepared by reaction of the hydrocarbon with acetyl chloride using aluminum chloride catalyst. The derivative was obtained as a viscous colorless liquid, B.P. 128–129° C. (1 mm.) $n_D^{20}$ 1.5302 having a musk-like odor.

*Analysis.*—Calcd. for $C_{18}H_{26}O$: C, 83.65; H, 10.13. Found: C, 83.32; H, 9.89.

*Example XV.—1,1,2,4-tetramethyl-7-isopropylindan*

Into a rapidly-stirred suspension of 200 g. of 93% sulfuric acid and 500 g. p-cymene, cooled to −5° C. was added dropwise a solution of 77.5 g. 2,3-dimethyl-1,3- butadiene in 100 g. p-cymene over a 4 hour period maintaining the temperature between —5 and 0° C. The mixture was stirred 40 minutes longer after the addition and allowed to settle. The lower sulfuric acid layer was run off and discarded. The oil layer was washed successively with 200 ml. of water, 200 ml. of aqueous 5% caustic soda solution and 200 ml. of aqueous 5% sodium bicarbonate solution. The excess p-cymene was distilled off and the product vacuum distilled. There was obtained 39 gms. of product, B.P. 98–100° C. (2 mm.), $n_D^{20}$ 1.5174, sp. gr. 25°/25° C. 0.9206.

Analysis.—Calcd. for $C_{16}H_{24}$: C, 88.8; H, 11.1. Found: C, 89.03; H, 10.98.

Infrared and nuclear magnetic resonance spectrograms and the vapor phase chromatogram indicate that the product has the structure noted above and is of a purity higher than 90%.

The acetyl derivative, $C_{18}H_{26}O$, a white colorless solid, crystallized from methanol, melted at 55–56° C. and had a mild musk-like odor.

Analysis.—Calcd. for $C_{18}H_{26}O$: C, 83.70; H, 10.13. Found: C, 83.52; H, 9.99.

Dinitro derivative, pale yellow crystals, M.P. 126–127° C. Calcd. for $C_{16}H_{22}N_2O_4$: C, 62.71; H, 7.24; N, 9.14. Found: C, 62.75; H, 7.14; N, 9.12.

*Example XVI.—1,1,4-trimethyl-6-isopropylindan*

By exactly the same method as given in Example XII there was condensed 150 g. of isoprene with m-cymene to yield this product, a colorless liquid, B.P. 82° (1 mm.), $n_D^{20}$ 1.5106, in a yield of 75.5% of theory (337 g.). The infrared spectrum shows the typical pattern for 1,2,3,5-tetrasubstitution on the aromatic ring with medium bands at 12.97μ and 13.96μ and the weaker pattern in the 5 to 6μ region. In addition there is absorption at 7.60μ, characteristic of indans. The vapor phase chromatogram shows one compound present to the extent of about 96%.

The acetyl derivative was prepared by acetylation in the presence of aluminum chloride using acetyl chloride. It was obtained as a colorless, odorless solid, M.P. 68.5–69°.

Analysis.—Calcd. for $C_{17}H_{24}O$: C, 83.55; H, 9.90. Found: C, 84.03; H, 9.70.

In each of Examples II to VI, inclusive, it is understood that 382 g. of the specified xylene is employed.

The foregoing illustrates the practice of this invention which, however, is not to be limited thereby, but is to be construed as broadly as permissible in view of the prior art and limited solely by the appended claims.

We claim:
1. The process for preparing compounds which may be represented as follows:

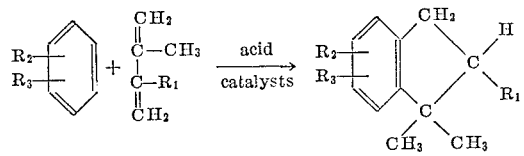

wherein $R_1$ is selected from H and $CH_3$, and $R_2$ and $R_3$ are alkyl groups having up to 5 carbon atoms, except that where $R_1$ is $CH_3$ and $R_2$ and $R_3$ are para to each other, and one of $R_2$ and $R_3$ is isopropyl, then the other is a member selected from the group consisting of methyl, isopropyl, tert.-butyl and tert.-amyl, which comprises reacting a dialklyl benzene of the formula:

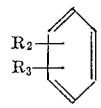

where $R_2$ and $R_3$ have the same significance as above, with a member selected from the group consisting of isoprene and 2,3-dimethyl-1,3-butadiene, in the presence of an acid catalyst useful in bringing about Friedel-Crafts reactions, at a temperature within the range from about —30° C. to about 150° C.

2. The process of claim 1, wherein isoprene is employed.
3. The process of claim 1, wherein said catalyst is aqueous sulfuric acid of about 75% to about 96% concentration and said temperature is within the range from about —30° C. to about 80° C.
4. The process of claim 1, wherein the catalyst is sulfuric acid of about 93% concentration and the temperature is within the range from about —10° C. to about 10° C.
5. The process of claim 3, wherein isoprene and meta xylene are the reactants.
6. The process of claim 3, wherein isoprene and para xylene are the reactants.
7. The process of claim 3, wherein isoprene and ortho xylene are the reactants.
8. The process of claim 3, wherein 2,3-dimethyl-1,3-butadiene and ortho xylene are the reactants.
9. The process of claim 3, wherein diethylbenzene and isoprene are the reactants.
10. The process of claim 3, wherein para-tert.-butyl-ethylbenzene and isoprene are the reactants.
11. The process of claim 3, wherein para-tert.-butyl-toluene and isoprene are the reactants.
12. The process of claim 3, wherein diisopropylbenzene and isoprene are the reactants.
13. The process of claim 3, wherein para cymene and isoprene are the reactants.
14. The process of claim 3, wherein meta cymene and isoprene are the reactants.
15. The process of claim 3, wherein para cymene and 2,3-dimethyl-1,3-butadiene are the reactants.
16. Diisopropyl-1,1-dimethylhexahydroindans.
17. 1,1,4-trimethyl-7-isopropylhexahydroindan.

References Cited by the Examiner

UNITED STATES PATENTS

| | | | |
|---|---|---|---|
| 2,375,041 | 5/1945 | Schmerling et al. | 260—671 |
| 2,382,260 | 8/1945 | Schaad | 260—671 |
| 2,404,120 | 7/1946 | Axe | 260—671 |
| 2,514,546 | 7/1950 | Ipatieff et al. | 260—666 |
| 2,622,110 | 12/1952 | Ipatieff et al. | 260—666 |
| 2,916,529 | 12/1959 | Sanford et al. | 260—668 |
| 3,078,319 | 2/1963 | Wood | 260—688 |
| 3,082,267 | 3/1963 | Hunter et al. | 260—668 |
| 3,151,174 | 9/1964 | Wood et al. | 260—668 |
| 3,152,192 | 10/1964 | Wood et al. | 260—668 |

OTHER REFERENCES

Chemical Abstracts 41, page 4477 (1947).
Chemical Abstracts 46, page 5022 (1952).

DELBERT E. GANTZ, *Primary Examiner.*
ALPHONSO D. SULLIVAN, *Examiner.*